United States Patent
Otomo

(10) Patent No.: US 6,402,264 B1
(45) Date of Patent: Jun. 11, 2002

(54) HYDRAULIC WHEEL BRAKE SYSTEM

(75) Inventor: Akihiro Otomo, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/289,062

(22) Filed: Apr. 12, 1999

(30) Foreign Application Priority Data

Apr. 14, 1998 (JP) .............................. 10-102476

(51) Int. Cl.[7] ................................................ B60T 8/42
(52) U.S. Cl. ................... 303/115.4; 303/11; 303/155; 303/116.1
(58) Field of Search .............. 303/10, 11, 155, 303/115.4, 115.5, 116.1

(56) References Cited

U.S. PATENT DOCUMENTS

| | | | |
|---|---|---|---|
| 4,817,767 A | | 4/1989 | Seibert et al. |
| 4,834,469 A | | 5/1989 | Kohno et al. |
| 5,048,899 A | * | 9/1991 | Schmitt et al. .......... 303/116.1 |
| 5,295,737 A | | 3/1994 | Epple et al. |
| 5,599,075 A | * | 2/1997 | Hara et al. .................. 303/143 |
| 5,791,745 A | | 8/1998 | Sakakibara |
| 5,947,567 A | * | 9/1999 | Jonner et al. ............ 303/115.4 |
| 5,979,998 A | * | 11/1999 | Kambe et al. ........... 303/116.1 |
| 6,065,816 A | * | 5/2000 | Nakazawa ................ 303/116.4 |
| 6,076,897 A | | 6/2000 | Binder et al. |
| 6,113,197 A | * | 9/2000 | Kuroki et al. ................. 303/11 |
| 6,120,003 A | * | 9/2000 | Lubischer et al. ....... 303/119.2 |
| 6,126,248 A | | 10/2000 | Kawahata et al. |
| 6,158,825 A | | 12/2000 | Schunck et al. |

FOREIGN PATENT DOCUMENTS

| | | |
|---|---|---|
| JP | 5-139279 | 6/1993 |
| JP | 5-147524 | 6/1993 |
| JP | 9-256960 | 9/1997 |

* cited by examiner

*Primary Examiner*—Matthew C. Graham
*Assistant Examiner*—Devon Kramer
(74) *Attorney, Agent, or Firm*—Finnegan, Henderson, Farabow, Garrett, & Dunner, L.L.P.

(57) ABSTRACT

A hydraulic wheel brake system including a plurality of brakes and a hydraulic brake controller. The brakes includes wheel cylinders corresponding respectively to each wheel. The hydraulic brake controller includes a pump device, and a pump and valve controller. At least one pump included in the pump device is reversible. By controlling the pump and valve controller the pump increases brake fluid pressure in the brake during braking and the brake fluid pressure is reduced through the pump when it is required to be reduced. The hydraulic brake controller has a normal-open solenoid valve between a reservoir and the brake. The normal-open solenoid valve allows the brake fluid to flow when an electric current is not supplied. The hydraulic brake controller has also a normal-close solenoid valve between the reservoir and the brake. The normal-close solenoid valve prevents the brake fluid from flowing when an electric current is not supplied.

11 Claims, 5 Drawing Sheets

TO THE BRAKE

TO THE BRAKE

HYDRAULIC WHEEL BRAKE SYSTEM

FIELD OF THE INVENTION

This invention relates to a hydraulic wheel brake system for a wheeled vehicle, a manufacturing machine, a testing machine or other similar machine, which is operated by brake fluid pumped by one or more pumps.

BACKGROUND OF THE INVENTION

One example of such a hydraulic brake system for a wheeled vehicle as mentioned above is disclosed in Japanese CSC Laid-Open Patent Application No. 9-256960. This system has a brake and a hydraulic brake controller. The brake is operated by brake fluid pressure. The hydraulic brake controller includes (1) a pump device which is connected to the brake and has two pumps located in a parallel row in a circuit and (2) a pump device controller which controls the brake fluid pressure of the brake by controlling rotating conditions of the two pumps included in the pump device.

In this hydraulic wheel brake system, brake fluid discharged from at least one of the two pumps is supplied to the brake, and the brake fluid pressure increases. By switching selectively between an operation-mode and a non-operation-mode of each of the two pumps, a cooperative-pressure-increase-mode in which the brake fluid from both pumps is supplied to the brake or an independent-pressure-increase-mode in which the brake fluid from one pump is supplied to the brake is selected, so that the flow of fluid to the brake is controlled.

This hydraulic wheel brake system does not describe any method for reducing brake fluid in the brake through the pump.

SUMMARY OF THE INVENTION

It is an object of the present invention to provide a hydraulic wheel brake system having at least one brake and a hydraulic brake controller comprising a pump device, and a pump and valve controller which can not only increase but also reduce brake fluid pressure by controlling the condition of the pump device.

A brake is operatively connected to one or more wheels installed, for example on a vehicle. Each brake includes a wheel cylinder. A pump device comprising at least a pump discharges brake fluid drawing from a reservoir and sends the brake fluid to the brake for brake operation. Each pump is thus hydraulically connected to the brake. The pump device can select a pressure-increasing-mode for pumping the brake fluid from at least one pump to the brake, or a pressure-reducing-mode for discharging the brake fluid from the brake through at least one pump. The pump and valve controller included in the hydraulic brake controller controls the pressure of the brake fluid, flowing to the brake by controlling the rotating condition of the pump or rotating conditions of the pumps.

During normal braking, the brake requires low pressure and high volume brake fluid. During emergency braking, the brake requires high pressure and low volume brake fluid after the brake fluid pressure becomes rather high. If the pump device consists of two pumps, one of the pumps specifically bears a task of low-pressure-high-volume pumping and the other bears a task of high-pressure-low-volume pumping. If the pump device consists of only one pump, the pump has both functions of low-pressure-high-volume pumping and high-pressure-low-volume pumping.

In the pressure-increasing-mode during the braking, the low-pressure-high-volume pump works to supply brake fluid pressure to the brake. In the pressure-reducing-mode, the low-pressure-high-volume pump also works in the reverse condition, sucking brake fluid from the brake to the reservoir. When the high brake fluid pressure is required during the emergency braking, the high-pressure-low-volume pump works.

The reversible condition is achieved by selecting either a normal or reverse rotation direction of a rotary-type pump. It is also achieved by rotating a pump in the normal direction while changing brake fluid passages by providing turn switch valves.

A gear-type of the pump is adopted for the low-pressure-high-volume and reversible pump because it can rotate in both the normal and reverse directions. A vane-type pump is also available. Even if it is a plunger-type pump, it is also available if the hydraulic brake controller uses the turn switch valves as mentioned above. Although a plunger-type pump is adopted for the high-pressure-low-volume pump, other types of pump are also available.

In the pump device having two pumps mentioned above, the low-pressure-high-volume pump is reversible and the high-pressure-low-volume pump is not reversible. But other types of pump devices are also available such as a pump device comprising reversible pumps, a pump device comprising a low-pressure-high-volume non-reversible pump and a high-pressure-low-volume reversible pump, or a pump device comprising two non-reversible pumps.

The brake fluid pressure is controlled by selecting one of the two pumps if the pump device has two pumps. Furthermore the speed of increasing or reducing the brake fluid pressure is controlled by controlling the rotating speed of the pumps or pump.

The pump device is connected to each brake and controls the brake fluid pressure of each brake together in common. Therefore this hydraulic wheel brake system has an advantage of avoiding differences in brake fluid pressure of each brake.

In the case of the pump device with two pumps, the pump device includes a flow preventing valve. The flow preventing valve is located in a passage between the reversible pressure reducing pump, and the brake. It is used to select a connection-mode connecting the reversible pump to the brake or a preventing-mode preventing brake fluid from flowing from the brake to the pump. The pressure increasing pump is connected in parallel with the pressure reducing pump. When the flow preventing valve is determined to be in the preventing-mode, the brake fluid is prevented from flowing out from the brake via the pressure reducing pump. Consequently the brake fluid pressure of the brake does not reduce.

The pump device is connected to a reservoir (this reservoir is also called a master reservoir) for holding brake fluid, and a supplementary reservoir is located between the reversible pump and the reservoir. The brake fluid flows from the brake by way of the reversible pump. A check valve located in a fluid passage between the reservoir and the supplementary reservoir prevents the brake fluid from flowing from the reversible pump to the master reservoir while the opposite flow direction is allowed. The supplementary reservoir holds the discharged brake fluid from the wheel cylinder in the brake. So, until the supplementary reservoir is filled fully, the reversible pump can reduce the brake fluid pressure of the brake. Besides, the supplementary reservoir holds the brake fluid leaked from the reversible pump. Consequently, when the supplementary reservoir is full, the leaked fluid flow stops. That is, a maximum volume of the leaked fluid is limited by the maximum volume of the supplementary reservoir.

The hydraulic brake system has a master cylinder supplying fluid pressure responsive to the force applied to the brake pedal. The pump device is connected to the brake and not connected to the master cylinder. The normal-open solenoid valve is located in the way of the fluid return passage which links the reservoir with the brake controlled by pressure of the pump device without passing through the pump device. A normal-open solenoid valve is located in the fluid return passage for cutting the flow of the fluid return passage when an electric current is supplied and for allowing the brake fluid to flow in the fluid return passage when an electric current is not supplied.

As mentioned above when an electric current is not supplied, the brake fluid flows back to the master reservoir passing through the fluid return passage. Then the brake fluid pressure of the wheel cylinder is reduced. So this normal-open solenoid valve is also called a pressure reducing valve. The normal-open solenoid valve has an advantage that after the braking the brake fluid pressure of the wheel cylinder becomes zero and friction of the brake does not occur.

An open solenoid valve, which the normal-open solenoid valve belongs to, has a valve seat, a valve spool located so that the valve spool can move close to or away from the valve seat, a spring which biases the valve spool away from the valve seat, and an electric driving device providing an electric force in the opposite direction against the direction of the spring force.

The hydraulic brake controller also has a normal-close solenoid valve which is connected in the fluid return passage for sending the brake fluid in the fluid return passage when an electric current is supplied, and for cutting the flow of the fluid return passage when an electric current is not supplied. If the pressure reducing valve is a normal-close valve, the brake fluid pressure of the wheel cylinder controlled by the master cylinder is effective during braking even though there is a failure in the electric circuit. This is so because the normal-close solenoid valve is closed in such a case and the brake fluid of the wheel cylinder can't flow through the normal-close solenoid valve in the fluid return passage.

The pressure increasing valve and pressure reducing valve comprise a pressure-control-valve device which is located between the brake and the pump device and between the brake and the master reservoir, and used to connect the brake to the pump device or the master reservoir. By controlling the pump device, the brake fluid pressure of a plurality of brakes is controlled in common, and desirable braking performance is obtained. If an anti-lock control, a traction control, or a vehicle stability control is required, it is achieved by controlling the brake fluid pressure of each wheel cylinder on the basis of the pressure supplied by the pump device.

As mentioned above one advantage of this invention is that the brake fluid pressure is controlled precisely and smoothly, because the reversible pump reduces the brake fluid pressure precisely and smoothly. And another advantage is that durability of the solenoid valves is high because the pump device bears the task of the control of the brake fluid pressure rather than the solenoid valves.

BRIEF DESCRIPTION OF THE DRAWINGS

The above and optical objects, features, advantages and technical and industrial significance of this invention will be better understood by reading the following detailed description of a presently preferred embodiment of the invention, when considered in connection with the accompanying drawing, in which.

DESCRIPTION OF THE PREFERRED EMBODIMENTS

In the following and the accompanying drawings, the present invention will be described in more detail in terms of embodiments.

Figure 1:
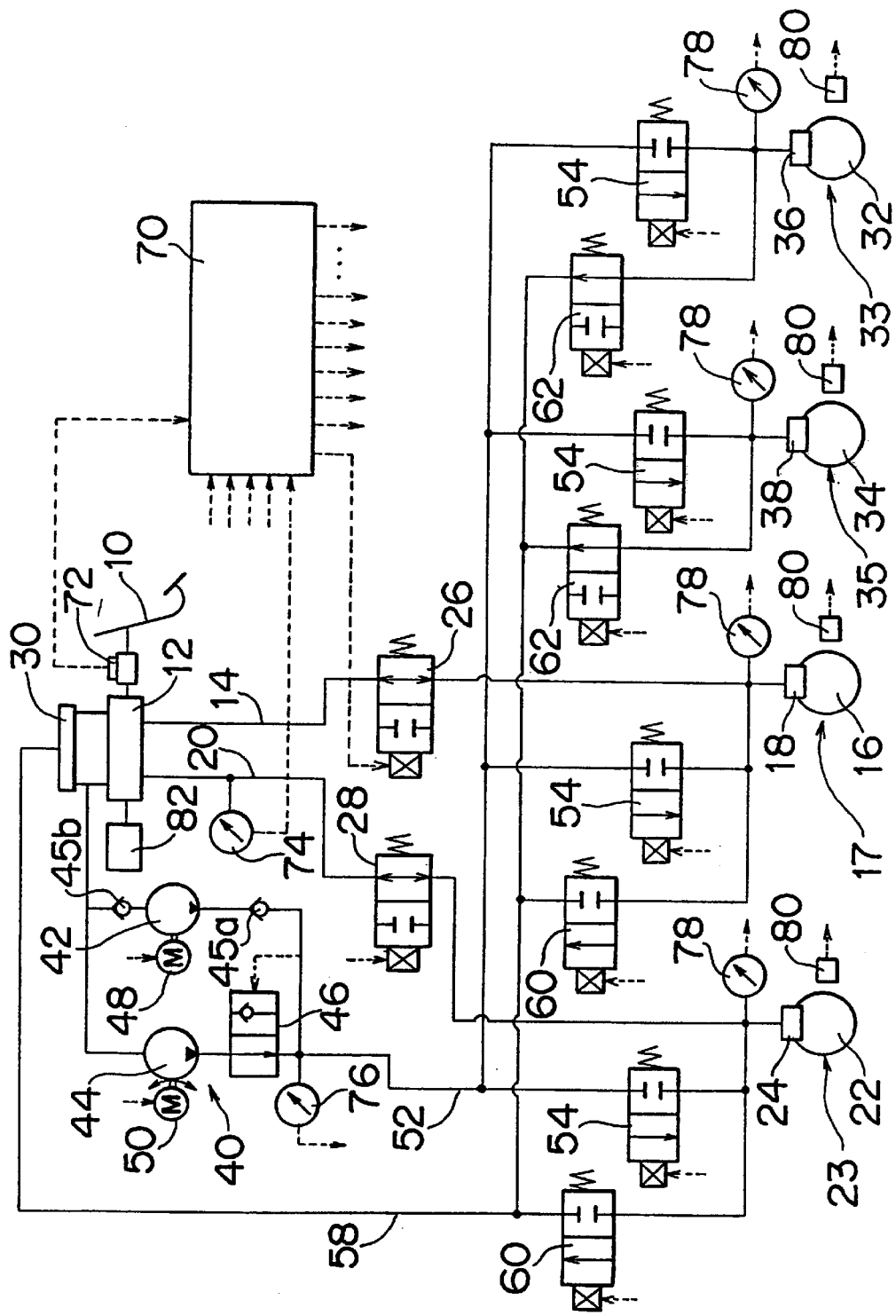
FIG. 1 is a diagram showing a hydraulic wheel brake system of the first embodiment of the hydraulic wheel brake system.

First, FIG. 1 shows the first embodiment in which the hydraulic wheel brake system is adopted to a vehicle having four wheels. Referring to this figure a braking operation element which is for example a brake pedal 10, is operated by a driver. A brake 17 is operatively connected to a front left wheel 16 and includes a wheel cylinder 18. A master cylinder 12 of a tandem type has two pressure chambers. One of the two pressure chambers is connected to the wheel cylinder 18 via fluid passage 14. When brake fluid pressure is applied to the wheel cylinder 18, the brake 17 brakes the front left wheel 16. In the same way, a brake 23 is operatively connected to a front right wheel 22 and includes a wheel cylinder 24. The other of the two chambers of the master cylinder 12 is connected to a wheel cylinder 24 via fluid passage 20. Open/close solenoid valves 26 and 28 are provided along the fluid passage 14 and 20 respectively.

The open/close solenoid valve 26 can select the condition of cutting the wheel cylinder 18 from the master cylinder 12 or the condition of linking the wheel cylinder 18 to the master cylinder 12 by switching on or off a solenoid of the open/close solenoid valve 26. Like the open/close solenoid valve 26, the open/close solenoid valve 28 can select the condition of cutting the wheel cylinder 24 from the master cylinder 12 or the condition of linking the wheel cylinder 24 to the master cylinder 12. During the braking operation when an electric current is supplied, the open/close solenoid valves 26 and 28 are closed. However during the non-braking operation when an electric current is not supplied, the open/close solenoid valves 26 and 28 are open. So each open/close solenoid valves 26, 28 is a normal-open valve and is kept open when there is a failure in an electric circuit of this hydraulic wheel brake system.

Brakes 33 and 35 are operatively connected to rear left and right wheels 32 and 34 respectively. And the brakes 33 and 35 include wheel cylinders 36 and 38 respectively. A reservoir ( which is also called a master reservoir ) 30 supplies brake fluid to the master cylinder 12. A pump device 40 is provided between the master reservoir 30 and the above-mentioned wheel cylinders 18, 24 ,36 and 38. The pump device 40 includes two pumps 42, 44, check valves 45a, 45b, and a flow preventing valve 46. The brake fluid pressure is provided by the pump 42 or 44 and supplied to the wheel cylinders 18, 24, 36, and 38. On the other hand the brake fluid of wheel cylinders 18, 24, 36, and 38 flows out to the master reservoir 30 via the pump 44. The brake fluid pressure of the wheel cylinders 18, 24, 36, and 38 is controlled so that a deceleration of the vehicle is given in response to an operation force of the brake pedal 10.

As shown in FIG. 1, the pumps 42, 44 are located in parallel, and are connected to the wheel cylinders 18, 24, 36, and 38. The pump 42 is a high-pressure-low-volume plunger-type pump, the maximum discharge pressure of which is high and the maximum discharge volume per second of which is low. It is also possible that the pump 42 is a high-pressure-low-volume gear-type pump. (The pump 42 is also called the high pressure pump 42 in the following.) Another pump 44 is a low-pressure-high-volume pump, the maximum discharge pressure of which is low and the maximum discharge volume per second of which is high and is a gear-type pump which is reversible. (The pump 44 is also called the low pressure pump 44 in the following.) Alternatively, a vane-type pump is also available for the low pressure pump 44. The high pressure pump 42 is driven by an electric motor 48 and the low pressure pump 44 is driven by an electric motor 50.

The discharge volume per second of the pumps 42, 44 is controlled respectively within the maximum discharge volume of each pump by controlling the rotation speed of the electric motor 48 or 50. The electric motor 50 is reversible. In this embodiment it can rotate in both the normal and reverse directions, so this motor 50 can rotate the low pressure pump 44 in both rotation directions. By changing the rotation direction of the low pressure pump 44, the normal direction or reverse, pressure-increasing-mode or pressure-reducing-mode can be selected in this hydraulic brake system.

When the electric motor 50 rotates in the normal direction, the low pressure pump 44 draws the brake fluid from the side of the master reservoir 30 and discharges the brake fluid into the side of wheel cylinders 18, 24, 36, and 38. This results in the pressure-increasing-mode. On the other hand, when the electric motor 50 rotates in the reverse direction, the low pressure pump 44 draws brake fluid from the side of the wheel cylinders 18, 24, 36, and 38 into the side of the master reservoir 30. This results in the pressure-reducing-mode. In such ways as mentioned, by controlling the rotation direction of the electric motor 50, the pressure-increasing-mode wherein the low pressure pump 44 supplies brake fluid to the wheel cylinders 18, 24, 36, and 38 or the pressure-reducing-mode wherein the low pressure pump 44 discharges the brake fluid from the wheel cylinders 18, 24, 36, and 38 is selected. As mentioned above, the low pressure pump 44 is a gear type pump, so there is a possibility of leakage. The pressure of the brake fluid can be reduced by using this leakage.

Incidentally, the low pressure pump 44 works at the condition of normal braking, that is, when the pressure of the brake fluid is substantially 3 MPa or less, and stops at the condition, when the pressure of the brake fluid is over 3 MPa. On the other hand the high pressure pump 42 stops at pressures of 3 MPa or less, and works at pressures of more than 3 MPa. In these ways the brake fluid discharged from either one of the two pumps is supplied selectively to the wheel cylinders 18, 24, 36, and 38.

During normal braking, the control of the electric motor 50 determines the condition of the low pressure pump 44, and the brake fluid pressure of the wheel cylinders 18, 24, 36, and 38 is determined. In this embodiment of the invention, brake fluid controlled by the pump device 40 is supplied to the wheel cylinders 18, 24, 36, and 38 simultaneously, so the brake fluid pressure of these wheel cylinders is controlled at the approximately the same level, because the four wheel cylinders are connected to the pump device 40. When the pedal 10 is pressed at the initial stage, the low pressure pump 44 can supply a large amount of brake fluid, because its volume is high. This results in that a reduced time lag in the effectiveness of the braking. Furthermore the deceleration of the vehicle responds to the pressing force of the pedal 10 by controlling the pressure of the wheel cylinders 18, 24, 36, and 38.

When the force applied to the brake pedal 10 is greater and the brake fluid pressure of the wheel cylinders 18, 24, 36, and 38 exceeds 3 Mpa, the high pressure pump 42 begins to work and the low pressure pump 44 stops. The brake fluid discharged from the high pressure pump 42 is supplied to the wheel cylinders 18, 24, 36, and 38, and the pressure of the brake fluid is increased. So a high braking force is effective. Pressure of the wheel cylinders 18, 24, 36, and 38 exceeding 3 MPa usually occurs in the condition of an emergency, and it is less likely that a driver is nervous about the braking feeling. So it is not necessary to reduce the pressure of the wheel cylinders 18, 24, 36, and 38 and it is enough to increase the pressure of the wheel cylinders 18, 24, 36, and 38. Consequently the high pressure pump 42 is not necessary to be reversible of the pressure-increasing-mode and the pressure-reducing-mode.

The flow preventing valve 46 is a pilot type valve which can either link or disconnect, as shown FIG. 1. When the pressure of the discharged brake fluid from the high pressure pump 42 reaches the predetermined value, the link condition of the flow preventing valve 46 is changed to the disconnected condition, and the brake fluid is prevented from flowing from the wheel cylinders 18, 24, 36, and 38 to the low pressure pump 44. Then the brake fluid from the wheel cylinders 18, 24, 36, and 38 can't drain and can't flow via the low pressure pump 42 to the master reservoir 30.

If the preventing valve 46 is changed to the cut condition, leakage of the brake fluid from the low pressure pump 44 can't occur even if in the case of a failure of the low pressure pump 44.

In this embodiment, a reverse driven preventing device (not shown in FIG. 1) is provided between the low pressure pump 44 and the electric motor 50. So, when there is a pressure gap between the intake side and the discharge side of the low pressure pump 44 because of leakage of the brake fluid at the flow preventing valve 46 or other reason, and the reverse driven torque making the low pressure pump 44 rotate is generated and acts as a motor by the pressure gap, the electric motor 50 is prevented from rotating without fail by the reverse driven preventing device. This reverse driven preventing device is, however, not indispensable. The brake fluid can be prevented from flowing out enough without this reverse driven preventing device.

Along a fluid passage 52 which connects the pump device 40 to each wheel cylinder 18, 24, 36, 38, each normal-close solenoid valve 54, which links or disconnects the pump device 40 and each wheel cylinder 18, 24, 36, 38 is provided. The normal-close solenoid valve 54 functions as a pressure increasing valve, so it is also called a pressure increasing valve. When an electric current is not supplied to the normal-close solenoid valve 54, the normal-close solenoid valve 54 is closed, and when an electric current is supplied, it is open. So the valve 54 is called a normal-close solenoid valve.

When the pump device 40 is working, the normal-closed valve 54 is open and the brake fluid flows from the pump device 40 to each wheel cylinder 18, 24, 36, and 38. When the normal-close solenoid valves 54 are kept open, the brake fluid is supplied to each wheel cylinder 18, 24, 36, and 38. So the pressure of all wheel cylinders, 18, 24, 36, and 38 is equal.

A fluid return passage 58 is provided so that it links the wheel cylinders 18, 24, 36, and 38 with the master reservoir 30, bypassing the pump device 40 and the master cylinder 12. Along this fluid return passage 58, normal-close solenoid valves 60 and normal-open solenoid valves 62 which can select an open or closed condition and function as pressure reducing valve are provided. The normal-close valves 60 which are provided corresponding to the wheel cylinder 18 in the brake 17 and the wheel cylinder 24 in the brake 23 are closed when the electric current is not supplied. The normal-open valves 62 which are provided corresponding to the wheel cylinder 36 in the brake 33 and the wheel cylinder 38 in the brake 35 are open when the electric current is not supplied. When the normal-close solenoid valves 60 or the normal-open solenoid valves 62 are open, the brake fluid pressure of the wheel cylinders 18, 24 or the wheel cylinders 36, 38 is reduced. So they have a function of reducing the brake fluid pressure, and So each of the valves 60 and 62 is also called a pressure reducing valve.

Both the master cylinder 12 and the pump device 40 can be connected to the wheel cylinders 18, 24 corresponding to the front wheel 16, 22. On the other hand the master cylinder 12 is not connected to the wheel cylinders 36, 38 corresponding to the rear wheel 32, 34, though the wheel cylinders 36, 38 can be connected to the pump device 40. In other words the normal-close solenoid valves 60 corresponding to the wheel cylinders 18, 24 (that are also called wheel-cylinders-controlled-by-pressure-of-master-cylinder) are closed in the normal condition and the normal-open solenoid valves 62 corresponding to the wheel cylinders 36, 38 (that are also called wheel-cylinders-controlled-by-pressure-of-pump-device) are open in the normal condition.

If a normal-closed solenoid valve is adopted as a pressure reducing valve corresponding to a wheel-cylinder-controlled-by-pressure-of-pump-device, the normal-closed solenoid valve is kept open by supplying an electric current until the time at which the brake fluid from the wheel cylinder is estimated to flow out completely from the time of finishing of braking. After the time of flowing out, the closed condition of the normal-closed solenoid valve resumes. If the brake fluid pressure remains in the wheel cylinder after finishing braking, this may cause friction to the brake elements.

If a normal-open solenoid valve is adopted, however, after braking is completed the normal-open solenoid valve is kept open by stopping the supply of electric current. The brake fluid of the wheel cylinder then flows back to the master reservoir 30 and there is no friction to the elements of the brake.

On the other hand, a wheel-cylinder-controlled-by-pressure-of-master-cylinder is usually designed to be connected to a master cylinder when braking does not work, as a back-up safety device. In this embodiment the open/close solenoid valves 26, 28 are open during non-braking. Consequently the brake fluid of the wheel-cylinders-controlled-by-pressure-of-master-cylinders 18, 24 are returned back to the master cylinder 12 via the open/close solenoid valves 26, 28 which are open, not via the normal-close solenoid valves 54, when braking is over. The friction to the brake elements can thus be prevented from occurring even though the normal-open solenoid valves are not adopted for the pressure reducing valves, as mentioned above in this embodiment.

When there is a failure in the electric circuit, the open/close solenoid valves 26, 28 are open, and the normal-close solenoid valves 54 are closed. The wheel-cylinders-controlled-by-pressure-of-master-cylinders 18, 24 are disconnected from the pump device 40 and are connected only to the master cylinder 12. The brake fluid is, then supplied to the wheel-cylinders-controlled-by-pressure-of-master-cylinders 18, 24 and braking can be effective by the brake fluid pressure of the master cylinder 12. If a normal-open solenoid valve is adopted for the pressure reducing valve 60, in a failure condition of the electric circuit the pressure reducing valve 60 can not be closed and the brake fluid returns back to the master reservoir via fluid return passage 58. Braking may therefore not work in this case. In this embodiment, however, braking works even though there is a failure in the electric circuit, because the pressure reducing valves 60 are normal-close solenoid valves.

As mentioned above, in this embodiment the pressure reducing valves 60 corresponding to the wheel-cylinders-controlled-by-pressure-of-master-cylinders 18, 24 are the normal-close solenoid valves, and the pressure reducing valves 62 corresponding to the wheel-cylinders-controlled-by-pressure-of-pump-device 36, 38 are the normal-open solenoid valves. Then the friction of the brake elements doesn't occur and braking can be affected if a failure occurs in the electric circuit of this hydraulic wheel brake system. In addition consumed electric power during braking would be less than if the pressure reducing valves 60, 62 corresponding to all wheel cylinders 18, 24, 36, and 38 would be the normal-open solenoid valves.

Also, the hydraulic wheel brake system comprises the brakes including the wheel cylinders 18, 24, 36, and 38, and a hydraulic brake controller. Furthermore the hydraulic brake controller comprises the pump device 40, the valves 26, 28, 54, 60, and 62 and a pump and valve controller 70. The pump and valve controller 70, which is comprised of mainly computers, is included in the hydraulic brake controller. An input portion of the pump and valve controller 70 is connected to a brake switch 72 which senses whether the brake pedal 10 is pressed, a pressure sensor 74 which senses the brake fluid pressure of a brake chamber of the master cylinder 12, a pressure sensor 76 which senses the brake fluid pressure discharged from the pump device 40, pressure sensors 78 which sense pressure of wheel cylinders 18, 24, 36, and 38 respectively, and rotation speed sensors 80 which sense rotation speed of the wheel 16, 22, 32, and 34 respectively and etc.

An output portion of the pump and valve controller 70 is connected to each of the solenoid valves including the open/close solenoid valves 26, 28, the normal-open solenoid valves 62, the normal-close solenoid valves 54, 60, by a drive circuit (not shown in FIG. 1) and the electric motors 48, 50 by the drive circuit. A ROM (Read Only Memory) in the pump and valve controller 70 contains a control program for rotating condition of pump shown by the flow chart in FIG. 2, an anti-lock control program, a traction control program and etc., and a motor rotation speed control table shown in FIG. 3. In this embodiment the electric motor 48, 50 and the rotating condition of the high pressure pump 42 and the low pressure pump 44 are controlled so that the deceleration of the vehicle is generated in response to the force applied to the pedal 10.

The data of the force applied to the brake pedal 10 is acquired on the basis of the output from the pressure sensor 74. Because a stroke simulator 82 is added on the master cylinder 12, a driver of the vehicle feels a smooth pedal pressure even when the open/close solenoids 26, 28 are closed. When each of the solenoid valves 54 is open and each of the solenoid valves 60, 62 is closed, the brake fluid pressure discharged by the pump device 40 and sensed by the pressure sensor 76 is estimated to be equal to the brake fluid pressure of each wheel cylinder 18, 24, 36, 38.

A wheel slip during braking or driving at the each wheel 16, 22, 32, 34 is sensed on the basis of the estimated speed of the vehicle calculated by the speed of the each wheel 16, 22, 32, 34 by each of the rotation speed sensors 80. Anti-lock control or traction control is conducted on the basis of the slip condition.

The following explains actions in the hydraulic wheel brake system of this embodiment. The pump and valve controller 70 included in the hydraulic brake controller executes the control program for the rotation of pump as shown in FIG.2.

Figure 2:
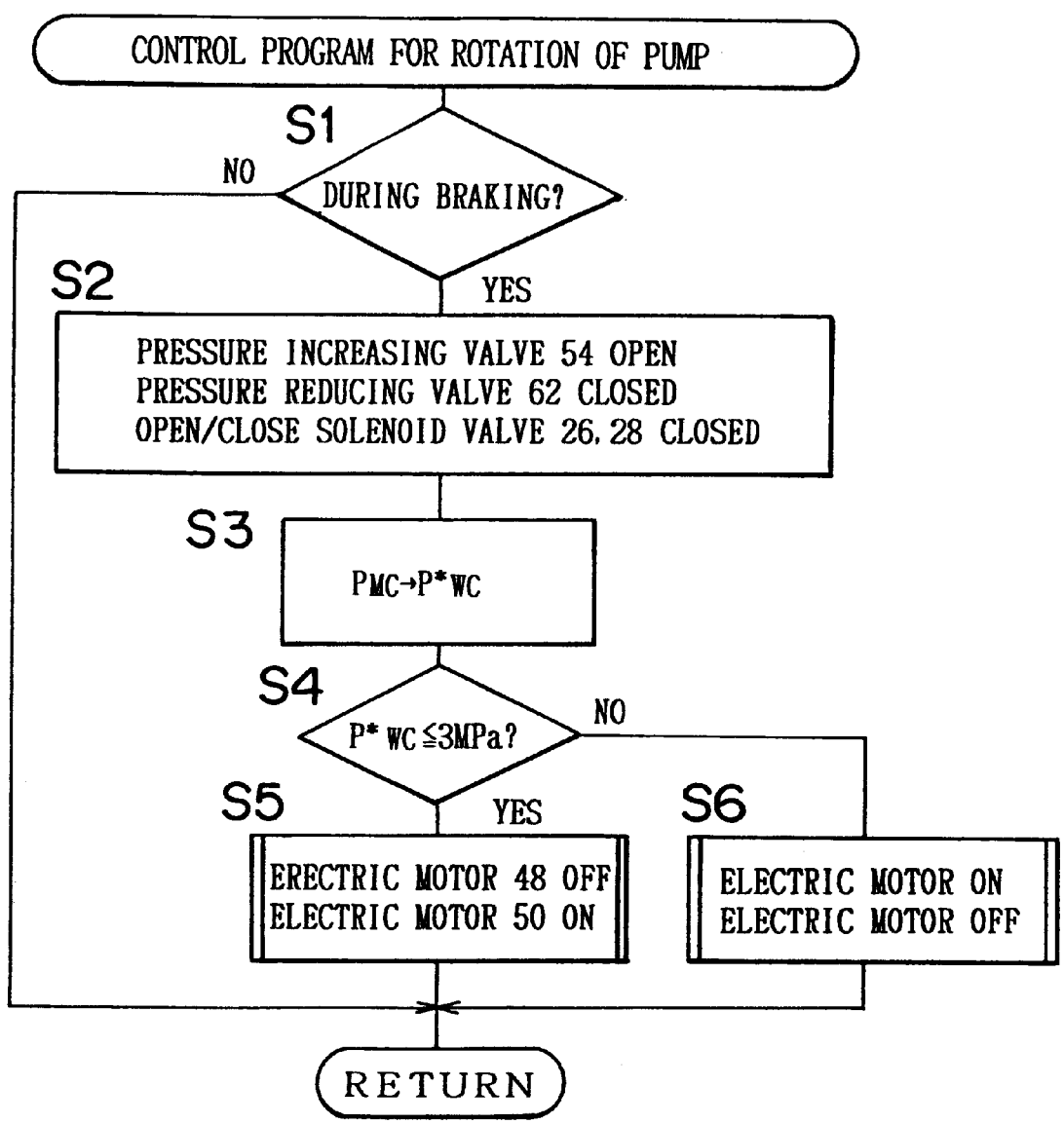
FIG. 2 is a flow chart illustrating a control program for the rotation of the pump in the hydraulic wheel brake system in FIG. 1.

When the electric circuit of the hydraulic wheel brake system is not abnormal, the brake fluid pressure of the wheel cylinders 18, 24, 36, and 38 is controlled on the basis of executions of the control program for changing the rotation of pump shown in flow chart of FIG. 2. Step S1 decides whether the brake pedal 10 is depressed by an output signal sent from the brake switch 72. When the brake pedal 10 is depressed, the open/close solenoid valves 26, 28 are changed to be closed, in step S2 the normal-close solenoid valves 54 are changed to be open, and the normal-open solenoid. valves 62 are changed to be closed.

Step S3 executes the calculation of the target fluid pressure of wheel cylinder P*wc on the basis of the pressing force of the brake pedal 10. Namely the value of fluid pressure of the wheel cylinders is decided so that the deceleration of the vehicle respective to the pressing force of the brake pedal 10. Step S4 determines whether the target fluid pressure of wheel cylinder P*wc is 3 MPa or less. If the determination of step S4 is YES, Step S5 decides that the electric motor 48 stops and the electric motor 50 is controlled to work. By controlling the rotation direction of the electric motor 50, the brake fluid is supplied to or discharged from wheel cylinders 18, 24, 36, and 38. Volume of the brake fluid flow is controlled by controlling the rotation speed of electric motor 50. In this case the electric motor 48 is turn off.

If the target fluid pressure of wheel cylinder P*wc exceeds 3 MPa, as in an emergency braking situation and the pressing force is greater, the electric motor 48 works, and the electric motor 50 is turn off. The brake fluid pressure of the wheel cylinders is increased by supplying the brake fluid from the high pressure pump 42. In this case the flow preventing valve 46 is changed to be closed and the brake fluid is prevented from draining from the discharging side of the high pressure pump 42 to the low pressure pump 44.

Figure 3:
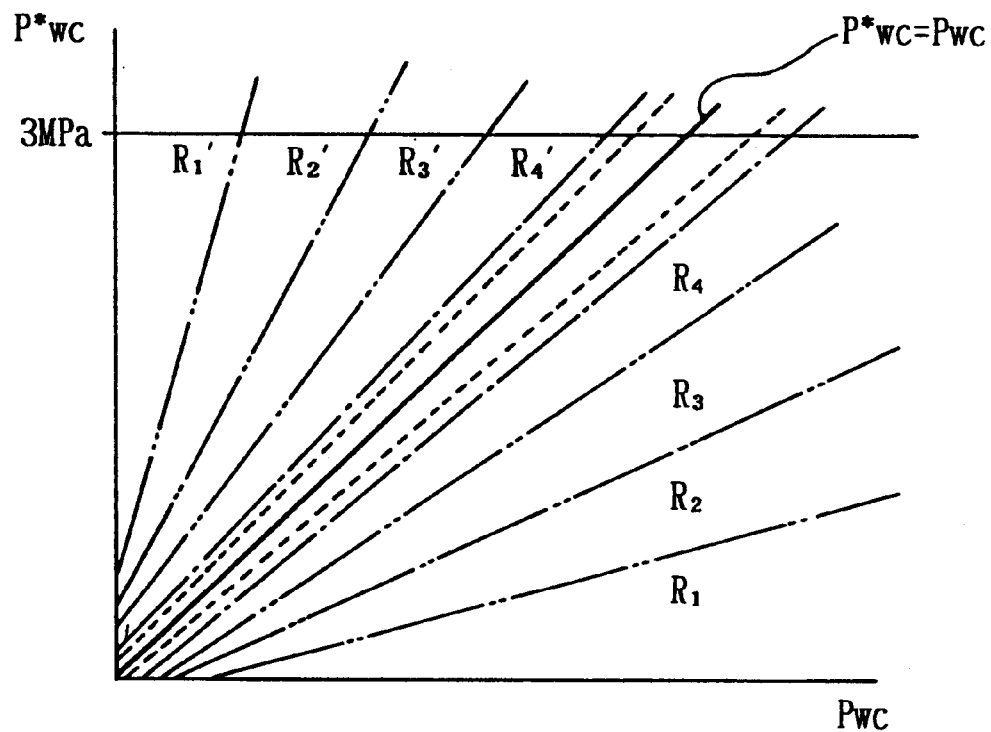
FIG. 3 is a graph indicating the relation between the real fluid pressure of a wheel cylinder and the target fluid pressure of a wheel cylinder in the hydraulic wheel brake system in FIG. 1.

The control of the electric motor 50 in step S5 is executed on the basis of the table chart shown in FIG. 3. If the target fluid pressure of wheel cylinder P*wc is higher than the real pressure of wheel cylinder Pwc, the electric motor 50 is rotated in the normal direction and the low pressure pump 44 increases the brake fluid pressure. If the target fluid pressure of wheel cylinder P*wc is lower than the real pressure of wheel cylinder Pwc, the electric motor 50 is rotated in the reverse direction and the low pressure pump 44 reduces the brake fluid pressure. If a difference between the target fluid pressure of wheel cylinder P*wc and the real pressure of wheel cylinder Pwc is greater, the rotating speed of the electric motor 50 is controlled to be higher. The discharging volume of the low pressure pump 44 becomes more, then the real pressure of wheel cylinder Pwc soon reaches the target fluid pressure of wheel cylinder P*wc. As shown in FIG. 3 it is determined to which area the difference between the target fluid pressure of wheel cylinder P*wc and the real pressure of wheel cylinder Pwc belongs in areas shown between double dashed lines. Following the decision of the rotation speed of the electric motor 50 (normal direction speed=Rn', or reverse direction speed=Rn), the electric motor 50 is rotated in the normal direction or the reverse direction, that is, increasing or reducing the brake fluid pressure to the wheel cylinders 18, 24, 36, and 38.

If the real wheel cylinder pressure Pwc is equal or close to the target fluid pressure of wheel cylinder P*wc, the electric motor 50 is turned off. In this embodiment there is hysteresis in the rotation of the electric pump 50. That is, if the difference between the target fluid pressure of wheel cylinder P*wc and the real pressure of wheel cylinder Pwc becomes bigger and passes over the chained line in FIG. 3, the electric pump 50 begins to rotate. On the other hand if the difference becomes smaller and passes over the dashed line, the electric motor 50 stops. By this hysteresis mentioned above, the electric motor 50 is prevented from changing the rotation condition frequently.

In the case of a failure of the electric circuit the wheel cylinders 18, 24 are connected to the master cylinder 12, because the open/close solenoid valves 26, 28 are open. And when the brake pedal 10 is depressed, the brake fluid of the master cylinder 12 is supplied to the wheel cylinders 18, 24, so the braking can be effective. The reason that such a hydraulic wheel brake system is designed so that the brake fluid is supplied to the front wheel cylinders 18, 24 from the master cylinder 12 is that the volume of the front wheel cylinders is higher than the that of the rear wheel cylinders.

When a braking friction of the brake element of at least one wheel exceeds a braking friction caused by a coefficient between the road and the wheel, the anti-lock control is executed. In such an occasion the open/close solenoid valves 26, 28 are closed. And by the control of the pressure increasing valves 54, and the pressure reducing valves 60, 62, the brake fluid pressure of the each wheel cylinder 18, 24, 36, 38 supplied by the pump device 40 is controlled so that the slipping condition of the each wheel 16, 22, 32, 34 is kept adequate.

When the slip of at least one wheel is excessive, the traction control is executed. Because the rear wheels are driven by the power train in this embodiment, the open/close solenoid valves 26, 28 are kept open, the pressure increasing valves 54 provided for the front wheels 16, 22 are closed, and the brake fluid pressure of the wheel cylinders 36, 38 for the wheel 32, 34 is controlled by the control of the pressure increasing valves 54 provided for the wheel cylinders 36, 38 and the pressure reducing valves 62. If the brake pedal 10 is depressed during the traction control, the brake fluid of the master cylinder 12 can be supplied to the front wheel cylinders 18, 24 via the open/close solenoid valve 26, 28 which are open. Incidentally during the anti-lock control or the traction control it is not indispensable to control the pump device 40. The pump can be kept in the predetermined rotating condition.

As mentioned above the brake fluid pressure of the wheel cylinders are controlled by the pump and valve controller 70.

Because all four wheel cylinders 18, 24, 36, and 38 are connected to the pump device 40, the brake fluid pressure of all four wheel cylinders can be controlled to be the same value. The brake fluid pressure of the four wheel cylinders 18, 24, 36, and 38 may not be the same if a pressure control valve is provided to each wheel cylinder and the each pressure control valve controls the brake fluid discharged by the pump device 40. In this embodiment, however, all wheel cylinders are controlled in common, so the brake fluid pressure of each wheel cylinder can be controlled to be the same value. Furthermore because the two pumps—a high pressure little volume pump and a low pressure large volume type pump—are provided, the cost of this embodiment is less than an embodiment with only one pump which concurrently has a function of discharging high pressure and high volume brake fluid.

In this embodiment, a gear pump is adopted as the low pressure low volume pump and the gear-type pump can rotate in the normal and reverse direction. Consequently a deceleration of the vehicle respective to the force applied to the brake pedal 10 is given during a normal braking when the force is not high. When the force applied to the brake pedal 10 is very high, it is not necessary in most cases to reduce the brake fluid pressure of the wheel cylinders 18, 24, 36, and 38, and it is enough to supply the brake fluid from a high pressure low volume pump.

Furthermore as the pressure reducing valves 60 corresponding to the wheel cylinders 18, 24 on the way from the master cylinder 12 are normal-close solenoid valves and the pressure reducing valves 62 corresponding to the wheel cylinders 36, 38 which are not connected to the master cylinder 12 are normal-open solenoid valves, the braking can work even if there is a failure in the electric circuit. Thus, friction torque is prevented from occurring.

Figure 4:
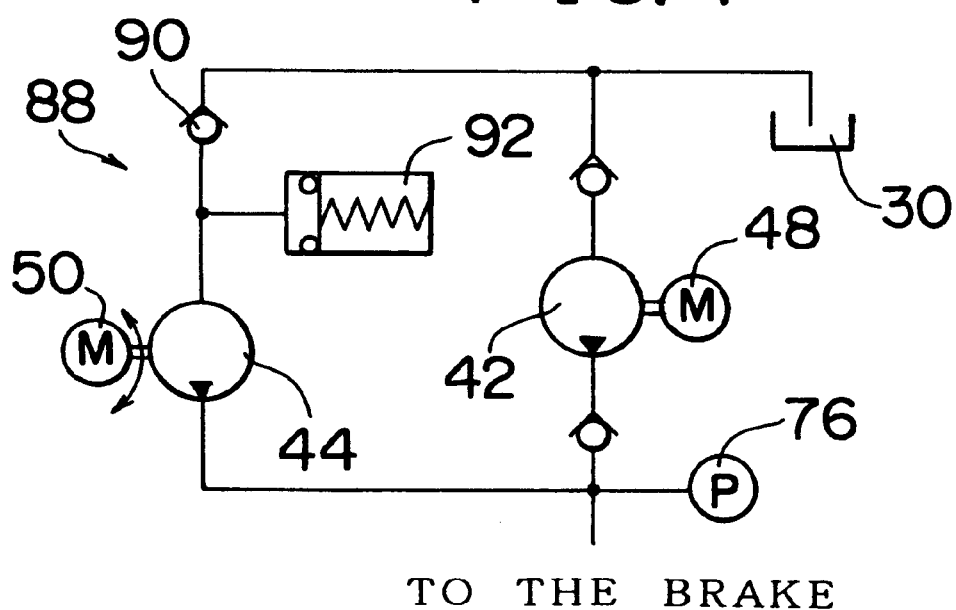
FIG. 4 is a diagram showing a pump device which is a part of a modified embodiment of the first embodiment in FIG. 1.

A structure of a pump device 88 shown in FIG. 4 is also available besides the embodiment mentioned above. Referring to FIG. 4 a check valve 90 is provided between the low pressure pump 44 and the master reservoir 30, and a supplementary reservoir 92 is provided between the supplementary reservoir 92 and the check valve 90. The check valve 90 allows the brake fluid to flow from the master reservoir 30 to the low pressure pump 44, however the check valve 90 prevents the brake fluid from flowing in reverse. The volume of the supplementary reservoir 92 is relatively low. The reservoir 92 holds the amount of the brake fluid flowing out from the wheel cylinders 18, 24, 36, and 38 when several consecutive braking operations occur causing a pressure reducing condition.

In the pressure-reducing-mode, the brake fluid flowing out from the wheel cylinders 18, 24, 36, and 38 passes through the low pressure pump 44 and is held by the supplementary reservoir 92. When the high pressure pump 44 works, the brake fluid drained via the low pressure pump 44 from the high pressure pump 42 is also held by the supplementary reservoir 92, because the supplementary reservoir 92 is located between the check valve 90 and the low pressure pump 44. If volume of brake fluid in the supplementary reservoir 92 reaches an upper limit, the pressure difference between the suction and discharge side of the low pressure pump 44 becomes small. So a volume of the drained brake fluid from the wheel cylinders side to the master cylinder side is restricted. Because the supplementary reservoir 92 has both functions of holding the brake fluid in the pressure-reducing-mode and of reducing a volume of the drained fluid from the low pressure pump 44, a designated volume of the supplementary reservoir 92 is determined depending on these conditions.

When the high pressure pump 42 works and increases the pressure of the brake fluid, the brake fluid held by the supplementary reservoir 92 and/or the master cylinder 30 is drawn by the high pressure pump 42. In the embodiment shown in FIG. 4, a reverse rotation preventing device is also provided between the low pressure pump 44 and the electric motor 50. So even though the brake fluid of the discharge side of the low pressure pump 44 drains out, the electric motor 50 is prevented from rotating in the reverse direction and large amounts of the brake fluid can not flow out via the low pressure pump 44.

The volume of the supplementary reservoir 92 may also be predetermined based on the volume necessary for one time braking. The reverse rotation preventing device is not indispensable. If the reverse rotation preventing device is not provided, the low pressure pump 50 can rotate in reverse, large amounts of the brake fluid flows out. However, the brake fluid can not flow out after reaching the upper limit of the volume of the supplementary reservoir 92.

Another acting condition of the two pumps 42, 44 is possible in a modified embodiment. For example, the low pressure pump 44 and the high pressure pump 42 work at the first stage of the braking in such an embodiment. Then a volume of the brake fluid supplied to the wheel cylinders is higher than the volume in the embodiment having only a low pressure pump 44, and the braking is quickly effective.

Figure 5:
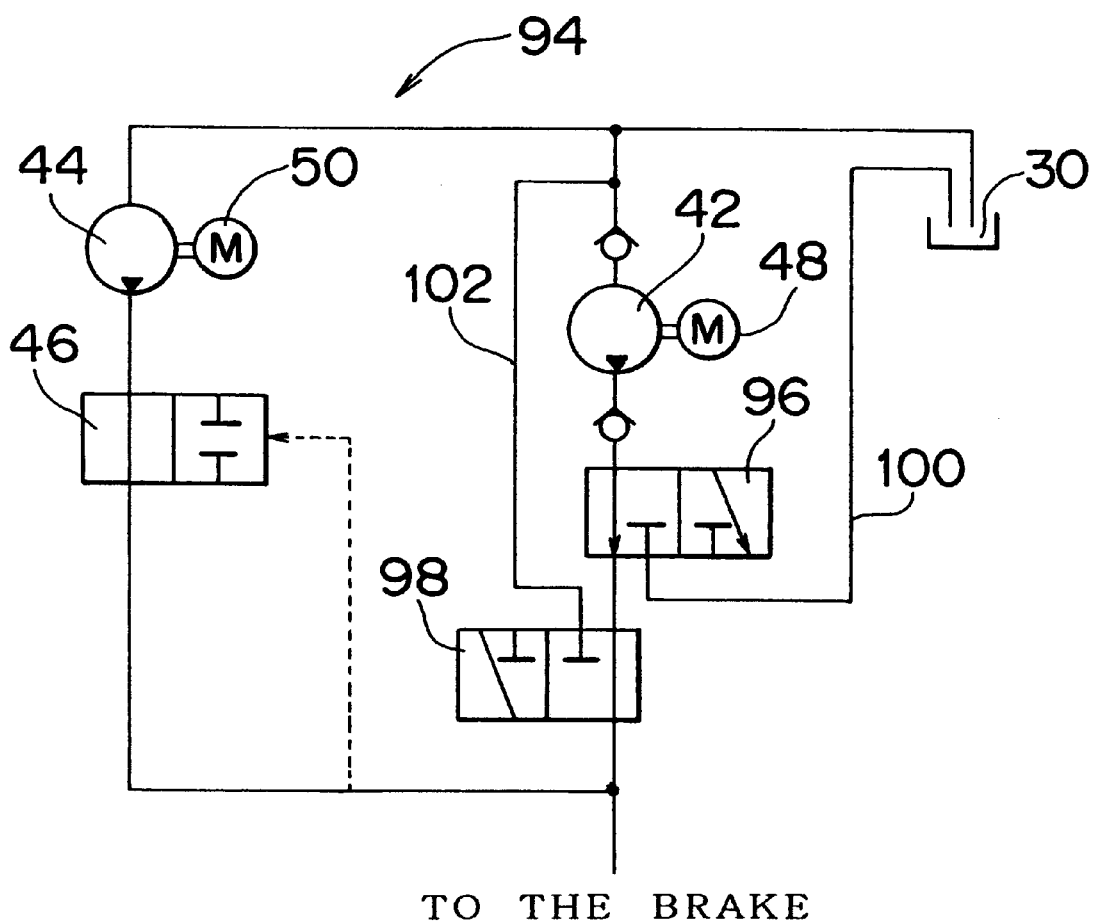
FIG. 5 is a diagram showing an another type of a pump device which is a part of a modified embodiment of the first embodiment in FIG. 1.

Furthermore, in another embodiment, the high pressure pump 42 could be a type of pump which can operate either a pressure-increasing-mode or pressure-reducing-mode. In this case the brake fluid pressure of the wheel cylinders is able to be controlled precisely even if it becomes high. A case having such a pump device 94 is shown in FIG. 5. Two turn switch valves 96, 98 are provided on the discharging side of the high pressure pump 42. The turn switch valve 96 can change the passage connecting the discharge port of the high pressure pump 42 to the wheel cylinders via the turn switch valve 98 (the first position) or to the master reservoir 30 via a fluid passage 100 (the second position). The turn switch valve 98 can change the passage connecting the discharge port of the high pressure pump 42 to the wheel cylinders via the turn switch valve 96 (the first position) or the passage connecting the suction port of the high pressure pump 42 to the wheel cylinders via a fluid passage 102 (the second position).

When the turn switch valves 96, 98 are at the first position, the brake fluid is discharged from the master reservoir 30, and the pressure of the brake fluid is increased by the high pressure pump 42 and supplied to the wheel cylinders via the turn switch valves 96, 98. When the turn switch valves 96, 98 are at the second position, the brake fluid flows back to the master reservoir 30 via the turn switch valve 98, a fluid passage 102, the high pressure pump 42, the turn switch valve 96 and the fluid passage 100, and the brake fluid pressure is reduced. Furthermore a damper can be provided on the side of the high pressure pump 42 and the low pressure pump 44. A pulsation of the pumps can be restricted by the damper.

It is not indispensable that the pressure increasing valves 54 are the normal-close solenoid valves, and it is also available to be normal-open solenoid valves. It is not necessary that the hydraulic brake system always has the anti-lock control system and/or the traction control system. In the case of the hydraulic wheel brake system without the anti-lock control and the traction control, the pressure increasing valves 54 and the pressure reducing valves 60, 62 are not necessary. In such a case it is also possible that the brake fluid of the wheel cylinders controlled by pressure of the pump device flows back to the master cylinder 30 by a reverse rotation of the low pressure pump 44 when the braking is over.

In the case of emergency braking, an automatic braking control could be conducted by supplying the brake fluid to the wheel cylinders 18, 24, 36, and 38 automatically.

The valves 54, 60, and 62 could be pressure control valves which can control the brake fluid pressure by controlling the flow of the brake fluid when they are open and in this case the valves 54, 60, and 62 are not merely open/close valves.

It is possible in other embodiments that a connecting passage linking the wheel cylinders 18 and 24 together is provided and along the connecting passage an open/close solenoid valve is provided. This open/close solenoid valve is closed when the brake fluid pressure of the two wheel cylinders 18, 24 is controlled independently in the anti-lock control and etc. The open/close solenoid valve is open, when the brake fluid pressure of the wheel cylinders 18, 24 is affected by the brake fluid of the master cylinder 12 in common or when there is a failure in the electric circuit. If the wheel cylinder 18 and 24 are connected directly, the left and right front wheel cylinders are controlled to be at the same pressure, and the stability of the vehicle during braking improves. It is an advantage that the braking performance of the left and right wheels is able to be the same when one of the pressure chambers in the master cylinder 12 happens to have something wrong and can not generate brake fluid pressure.

In the embodiment mentioned above, the pump device 40 is connected to all the wheel cylinders 18, 24, 36, and 38, and the wheel cylinders 18, 24 corresponding to the front wheels 16, 22 links the master cylinder 12. But another embodiment is also proposed concerning the connection between the wheel cylinders 18, 24, 36, and 38 and the master cylinder 12, the pump device 40. For example the wheel cylinders 36, 38 corresponding to the rear wheels 32, 34 is connected to the pump device 40 and the wheel cylinders 18, 24 corresponding to front wheels 16, 22 are connected to the master cylinder 12. In another case it is possible that the master cylinder 12 and the pump device 40 are connected to all the wheel cylinders 18, 24, 36, and 38. In any event, it is sufficient that at least one of the four wheel cylinders is connected to the pump device 40.

Figure 6:
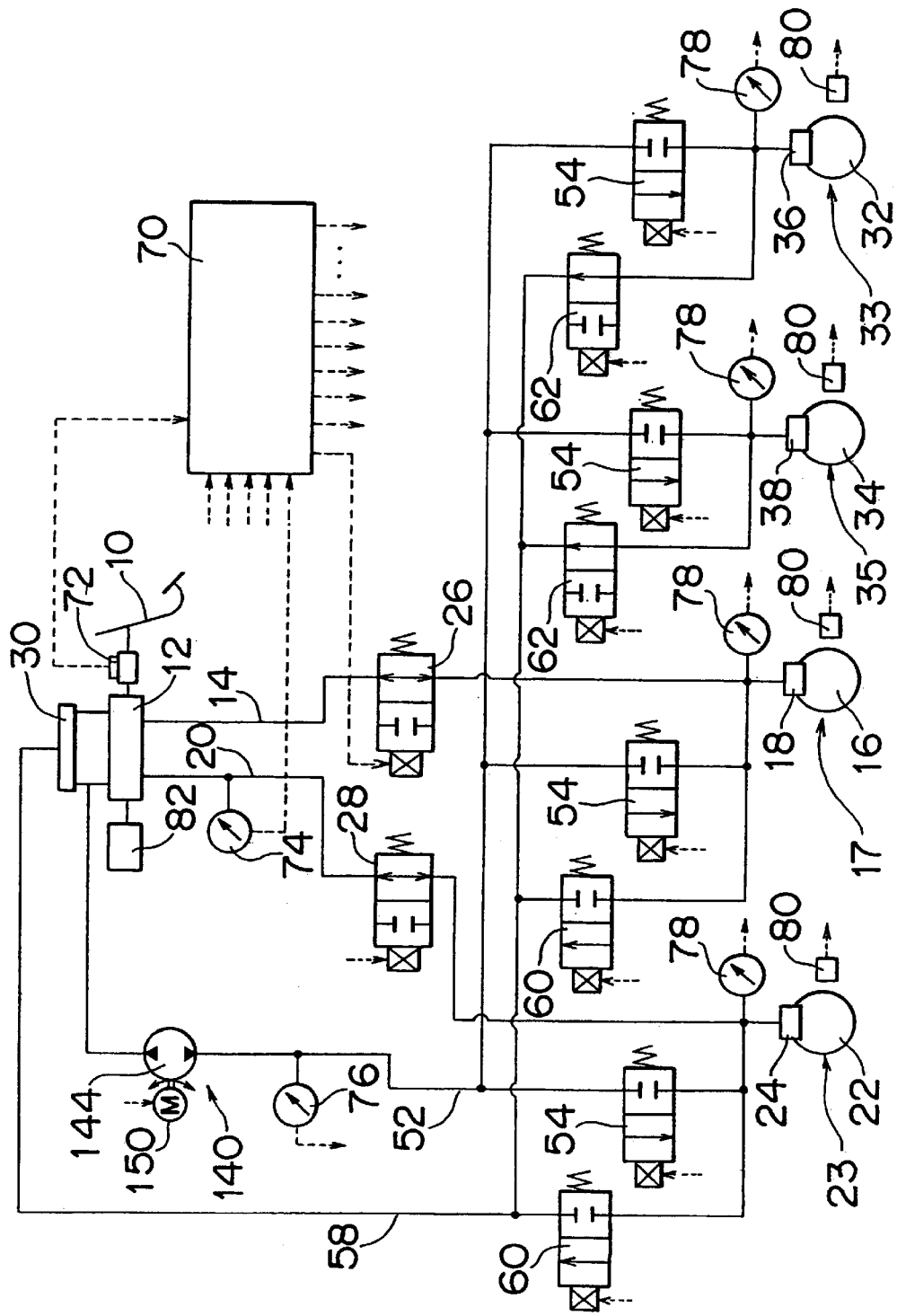
FIG. 6 is a diagram showing a hydraulic wheel brake system of the second embodiment of the hydraulic wheel brake system.

The second embodiment of this invention is depicted in FIG. 6. This embodiment is the same as the first embodiment except the pump device. A pump device 140 in FIG. 6 is explained as follows.

The pump device 140 comprises only one pump 144. The pump 144 is driven by an electric motor 150. The electric motor 150 can rotate in the normal or reverse rotation direction. So by the signal of the pump and valve controller 70 the pump 144 is controlled in the normal rotation direction at a certain time, or the reverse rotation direction at another time. When the pump 144 rotates in the normal direction, the brake fluid is discharged from the master reservoir 30 to the fluid passage 52. The pressure sensor 76 senses the pressure value of the brake fluid discharged from the pump 144. When the pump 144 rotates in the reverse direction, the brake fluid is discharged from the fluid passage 52 and flows out to the master reservoir 30.

The discharge volume per second of the pumps 144 is controlled within the maximum discharge volume of the pump by controlling the rotation speed of the electric motor 150. Although a gear type is adopted to the pump 144, a vane type is also available. During the normal braking the low-pressure-high-volume brake fluid is required, and during emergency braking the high-pressure-low-volume brake fluid is required. These requirements are achieved by the pump 144, while in the first embodiment the low pressure pump 44 and high pressure pump 42 bear the tasks separately. So the pump 144 is required to discharge the brake fluid within the designated range of pressure and volume.

The method of controlling the increase or reduction of the brake fluid pressure of the wheel cylinders 18, 24, 36, and 38 by controlling the hydraulic brake controller is the same as the first embodiment as mentioned above.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A hydraulic wheel brake system comprising:
a plurality of brakes, each brake being operatively connected to a respective wheel, the brakes receiving brake fluid for operation; and
a hydraulic brake controller for controlling the brake fluid sent to the brakes, the hydraulic controller including a pump device having at least two pumps hydraulically connected to the brakes, the pump device selecting a pressure-increasing-mode for pumping the brake fluid from at least one of the at least two pumps to the brakes or a pressure-reducing-mode for discharging the brake fluid from the brakes through the at least one of the two pumps, and a pump and valve controller controlling the brake fluid pressure to the brakes, wherein the brake fluid pressure is controlled to all of the brakes together in common; and
wherein one of the at least two pumps has a higher maximum discharge volume per second than a second of the at least two pumps and a lower maximum discharge pressure than the second pump.

2. A hydraulic wheel brake system comprising:
a plurality of brakes, each brake being operatively connected to each wheel, and each brake receiving brake fluid for operation; and
a hydraulic brake controller for controlling the brake fluid sent to the brakes, the hydraulic brake controller including a pump device having two pumps, one of the pumps being a rotary-type pump hydraulically connected to the brakes, the other of the two pumps being a plunger-type pump hydraulically connected to the brakes, the pump device selecting a pressure-increasing-mode for pumping the brake fluid from the rotary-type pump to the brakes or a pressure-reducing mode for discharging the brake fluid from the brakes through the rotary-type pump by controlling the rotation direction of the rotary-type pump, and a pump and valve controller for controlling the brake fluid pressure to the brakes by controlling the rotating condition of the rotary-type pump,
wherein the pump device is connected to each brake and the brake fluid pressure of each brake is controlled together in common; and
wherein the pressure-increasing mode or the pressure-reducing mode is selected by changing a rotation direction of the rotary-type pump.

3. The hydraulic wheel brake system according to claim 1 or 2, wherein the pump device has at least a pressure reducing pump which is connected to the brake for reducing the pressure of the brake fluid from the brake, and a flow preventing valve located in a passage between the pressure reducing pump and the brake for selecting a connection-mode connecting the pressure reducing pump to the brake or a prevention-mode preventing brake fluid from flowing from the brake to the pressure reducing pump.

4. The hydraulic wheel brake system according to claim 3, wherein the pump device has a pressure increasing pump connected in parallel with the pressure reducing pump and being for increasing the brake fluid pressure to the brake.

5. The hydraulic wheel brake system according to claim 1 or 2, wherein the pump device is connected to a reservoir for holding brake fluid and includes a pressure-increasing-reducing-pump located in a fluid passage between the reservoir and the brake for supplying brake fluid discharged from the pressure-increasing-reducing-pump to the brake or for discharging brake fluid to the reservoir, a supplementary reservoir located between the pressure-increasing-reducing-pump and the reservoir and to which the brake fluid flows from the brake by way of the pressure-increasing-reducing-pump, and a check valve located in the fluid passage between the reservoir and the supplementary reservoir for preventing the brake fluid from flowing from the pressure-increasing-reducing-pump to the reservoir while the opposite flow direction is allowable.

6. The hydraulic wheel brake system according to claim 1 or 2, further a reservoir for holding brake fluid, a fluid return passage linking the reservoir and the brake without passing the pump device, and a normal-open solenoid valve located in the fluid return passage for cutting the flow of the fluid return passage when an electric current is supplied and for allowing the brake fluid to flow in the fluid return passage when an electric current is not supplied.

7. The hydraulic wheel brake system according to claim 6, wherein the normal-open solenoid valve has a valve seat, a valve spool located so that the valve spool can move to be close to or away from the valve seat, a spring which biases the valve spool away from the valve seat, and an electric driving device providing an electric driving force in the direction against the direction of the spring force.

8. The hydraulic wheel brake system according to claim 6, further comprising a master cylinder supplying fluid pressure responsive to a pressing force of a brake pedal, wherein the hydraulic brake controller includes the pump device connected to the brake and not connected to the master cylinder, and a normal-open solenoid valve located in the fluid return passage which links the reservoir with the brake controlled by pressure of the pump device.

9. The hydraulic wheel brake system according to claim 1 or 2, further comprising a fluid return passage which links the reservoir with the brake controlled by pressure from the master cylinder without connecting the pump device and the master cylinder, and a normal-close solenoid valve in the fluid return passage for sending the brake fluid in the fluid return passage when an electric current is supplied and for cutting the flow of the fluid return passage when an electric current is not supplied.

10. The hydraulic wheel brake system according to claim 1 or 2, further comprising a pressure-control-valve-device located between the brake and the pump device and between the brake and the reservoir, for connecting the brake to the pump device or the reservoir.

11. The hydraulic wheel brake system of claim 2, wherein the one of the two pumps is a low-pressure pump, and the other of the two pumps is a high-pressure pump.

* * * * *